US008862078B2

(12) United States Patent
Yu

(10) Patent No.: US 8,862,078 B2
(45) Date of Patent: Oct. 14, 2014

(54) COMMUNICATION METHOD AND APPARATUS FOR MULTI-STANDBY MODE IN A COMMUNICATION TERMINAL

(75) Inventor: Ga Ram Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 13/272,445

(22) Filed: Oct. 13, 2011

(65) Prior Publication Data

US 2012/0157072 A1 Jun. 21, 2012

(30) Foreign Application Priority Data

Dec. 20, 2010 (KR) ........................ 10-2010-0130456

(51) Int. Cl.
| | |
|---|---|
| H04B 1/04 | (2006.01) |
| H04M 3/42 | (2006.01) |
| H04W 36/00 | (2009.01) |
| H04W 72/00 | (2009.01) |
| H04W 76/02 | (2009.01) |
| H04W 72/04 | (2009.01) |
| H04W 88/06 | (2009.01) |

(52) U.S. Cl.
CPC ........ H04W 76/025 (2013.01); *H04W 72/0446* (2013.01); *H04W 88/06* (2013.01)
USPC ........ 455/127.4; 455/406; 455/417; 455/443; 455/450; 455/558; 370/280; 370/294; 370/321

(58) Field of Classification Search
USPC .............. 455/416–417, 443, 450, 451, 452.1, 455/558, 553, 127.4; 370/280, 294, 321
See application file for complete search history.

(56) References Cited

U.S. PATENT DOCUMENTS

| | | | |
|---|---|---|---|
| 2005/0277429 A1* | 12/2005 | Laroia et al. ................... | 455/458 |
| 2006/0234693 A1* | 10/2006 | Isidore et al. .............. | 455/422.1 |
| 2008/0293394 A1 | 11/2008 | Silver et al. | |
| 2009/0215472 A1 | 8/2009 | Hsu | |
| 2009/0239584 A1 | 9/2009 | Jheng et al. | |
| 2010/0087224 A1* | 4/2010 | Kim et al. ................... | 455/552.1 |
| 2011/0111735 A1* | 5/2011 | Pietrow ...................... | 455/414.1 |
| 2012/0021755 A1* | 1/2012 | Chin et al. .................... | 455/450 |
| 2012/0040670 A1* | 2/2012 | Chin et al. ................. | 455/435.1 |

FOREIGN PATENT DOCUMENTS

| | | |
|---|---|---|
| JP | 2003-189361 A | 7/2003 |
| WO | 2010/073210 A1 | 7/2010 |
| WO | 2012/012787 A1 | 1/2012 |

* cited by examiner

*Primary Examiner* — Jinsong Hu
*Assistant Examiner* — Dung Hong
(74) *Attorney, Agent, or Firm* — Jefferson IP Law, LLP

(57) ABSTRACT

A method for communication in a communication terminal having a single communication module and at least two Subscriber Identification Module (SIM) cards is provided. The method includes performing a first call mode when a call is connected through a first base station in a standby mode by using the communication module and a first SIM card through a first time slot in each frame allocated by the first base station, and performing, when a second call is connected through a second base station while performing the first call mode, a second call mode using the communication module and a second SIM card through a second time slot in each frame allocated by the second base station, the second time slot being spaced apart from the first time slot.

18 Claims, 5 Drawing Sheets

COMMUNICATION METHOD AND APPARATUS FOR MULTI-STANDBY MODE IN A COMMUNICATION TERMINAL

PRIORITY

This application claims the benefit under 35 U.S.C. §119(a) of a Korean patent application filed on Dec. 20, 2010 in the Korean Intellectual Property Office and assigned Serial No. 10-2010-0130456, the entire disclosure of which is hereby incorporated by reference.

BACKGROUND OF THE INVENTION

1. Field of the Invention

The present invention relates to a communication method and a communication apparatus in a communication terminal. More particularly, the present invention relates to a communication method and a communication apparatus for a multi-standby mode in a communication terminal.

2. Description of the Related Art

Generally, communication terminals have various features to perform complex functions. Recently, communication terminals are being developed to have multiple modes to connect to at least two wireless communication networks. Such communication terminals can perform communication by accessing one of the communication networks according to a user's choice. In this case, the communication terminals may have difficulty in switching between the communication networks.

To address this issue, communication terminals capable of simultaneously accessing at least two communication networks provide a multi-standby mode. The communication terminal receives a preamble or pilot signal from each communication network to determine a channel status. The communication terminal transmits a paging signal to each communication network. The communication terminal connects to each communication network using a single communication module. The communication terminal handles a call through at least one of the communication networks using the communication module.

In the conventional communication terminal described above, when a call is performed through one of the communication networks, a connection to other communication networks is terminated. This is because the communication module is used by the communication terminal for handling the call and thus the communication module is not available to maintain connections to other communication networks. In this case, the communication terminal can be designed to include a plurality of communication modules to connect to the respective communication networks; however, such designs limit minimization of the communication terminal.

SUMMARY OF THE INVENTION

Aspects of the present invention are to address at least the above-mentioned problems and/or disadvantages and to provide at least the advantages described below. Accordingly, an aspect of the present invention is to provide a communication terminal that can connect to a plurality of communication networks using a single communication module. Aspects of the present invention also maintain a connection to other communication networks when a call is performed through one of the communication networks.

In accordance with an aspect of the present invention, a communication method in a communication terminal having a single communication module and at least two Subscriber Identification Module (SIM) cards is provided. The method includes performing a first call mode when a call is connected through a first base station in a standby mode using the communication module and a first SIM card through a first time slot in each frame allocated by the first base station, and performing, when a second call is connected through a second base station while performing the first call mode, a second call mode using the communication module and a second SIM card through a second time slot in each frame allocated by the second base station, the second time slot being spaced apart from the first time slot.

In accordance with another aspect of the present invention, a communication apparatus in a communication terminal is provided. The communication apparatus includes a single communication module for connecting to at least two base stations, at least two SIM cards, each storing SIM information corresponding to one of the at least two base stations, and a control unit for performing, when a first call is connected through a first base station in a standby mode, a first call mode using the communication module and a first SIM card through a first time slot in each frame allocated by the first base station, and for performing, when a second call is connected through a second base station while performing the first call mode, a second call mode using the communication module and a second SIM card through a second time slot in each frame allocated by the second base station, the second time slot being spaced apart from the first time slot.

In accordance with another aspect of the present invention, a method of communicating with at least two different communication networks via a single mobile device is provided. The method includes performing a first call mode via a first time slot of a frame when a call is connected through a first base station of a first communication network, when a second call is connected through a second base station of a second communication network while performing the first call mode, performing a second call mode via a second time slot of the frame, wherein the first time slot and the second time slots are both time slots of a frame.

According to an exemplary communication method and a communication apparatus for multi-standby mode in a communication terminal of the present invention, a multiple standby mode can be performed with respect to a plurality of communication networks using a single communication module. Here, when performing a call mode through one of the communication networks, a standby mode can be performed with respect to other communication networks. Namely, the communication terminal can maintain connection to the other communication networks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
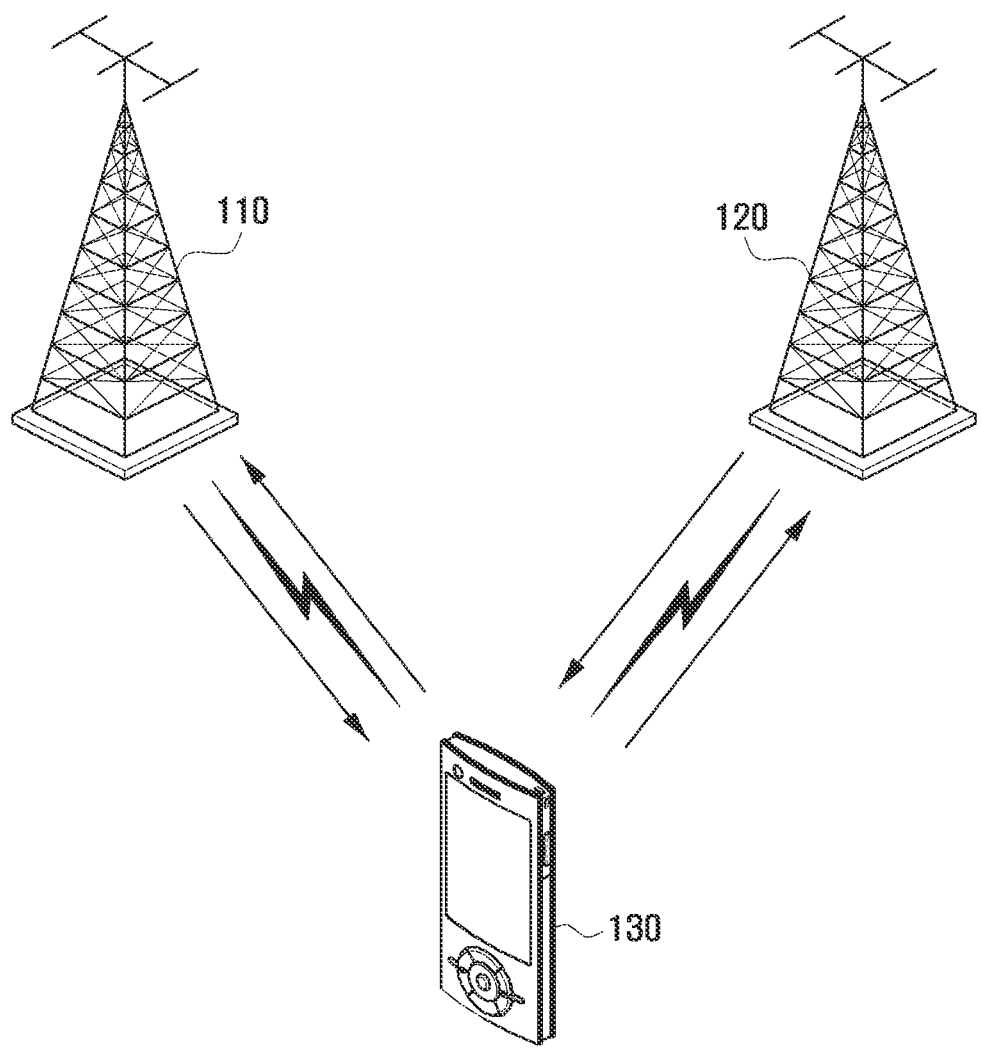
FIG. 1 illustrates a structure of a communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Furthermore, well known or widely used techniques, elements, structures, and processes may not be described or illustrated in detail to avoid obscuring the essence of the present invention. Although the drawings represent exemplary embodiments of the present invention, the drawings are not necessarily to scale and certain features may be exaggerated or omitted in order to better illustrate and explain the present invention.

A communication terminal according to an exemplary embodiment of the present invention provides a multi-standby mode and can connect to at least one network that supports various communication methods including, for example, Code Division Multiple Access (CDMA), Global System for Mobile communications (GSM), Wideband CDMA (WCDMA), and Wireless Broadband internet (WiBro). For clarity, and to improve the understanding of the present invention, it is assumed that the communication terminal has a single communication module; however, exemplary embodiments of the present invention should not be construed as being limited thereto. Exemplary embodiments of the present invention may be implemented as long as the communication terminal can access to multiple networks by using a single communication module.

FIG. 1 illustrates a structure of a communication system according to an exemplary embodiment of the present invention.

Referring to FIG. 1, the communication system includes a first base station 110, a second base station 120, and a communication terminal 130. The first base station 110 supports connectivity to a first communication network. The second base station 120 supports connectivity to a second communication network. The communication terminal 130 accesses the first communication network and the second communication network by connecting to the first base station 110 and the second base station 120, respectively.

The communication terminal 130 periodically receives a preamble or pilot signal from the first base station 110 and the second base station 120 in a multi-standby mode. The communication terminal 130 periodically transmits a paging signal to the first base station 110 and the second base station 120 in the multi-standby mode. The communication terminal 130 may perform a call mode through at least one of the first base station 110 and the second base station 120. While performing the call mode through the first base station 110, the communication terminal 130 can maintain the standby mode with respect to the second base station 120. The communication terminal 130 can transmit the paging signal to the second base station 120. Similarly, while performing the call mode through the second base station 120, the communication terminal 130 can maintain the standby mode with respect to the first base station 110. The communication terminal 130 can transmit the paging signal to the first base station 110.

Figure 2:
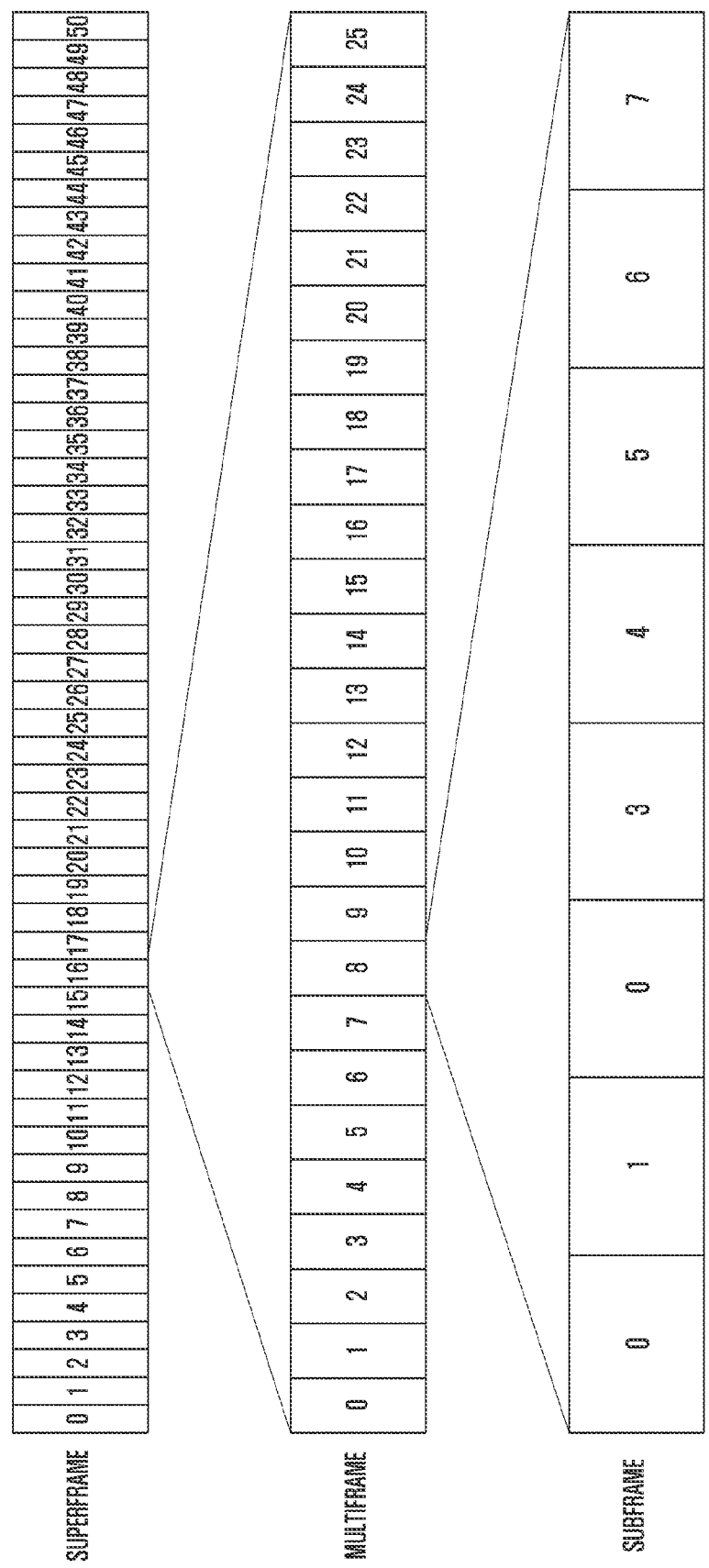
FIG. 2 illustrates a configuration of a superframe in a communication system according to an exemplary embodiment of the present invention.

FIG. 2 illustrates a configuration of a superframe in a communication system according to an exemplary embodiment of the present invention. The superframe is a basic unit that performs communication in a communication system. For illustrative purposes, it is assumed in this exemplary embodiment that the communication system supports Time Division Multiplexing (TDM).

Referring to FIG. 2, the superframe includes a plurality of multiframes. The superframe can have a length substantially corresponding to 6.12 seconds (s). Depending on the size of the multiframe, the superframe may include 51 multiframes or 26 multiframes. Each of the multiframes has a plurality of subframes. When the superframe includes 51 multiframes, each of the multiframes may have a length substantially corresponding to 120 milliseconds (ms). When the superframe includes 26 multiframes, each of the multiframes may have a length substantially corresponding to 235.385 milliseconds (ms). The multiframe may include 26 subframes. Each of the subframes in turn includes a plurality of time slots. For example, each of the subframes can include 8 time slots. Here, the subframe can have a length substantially corresponding to 4,615 milliseconds (ms). Each time slot of a subframe may have an index that is within a range of 0 to 7.

Figure 3:
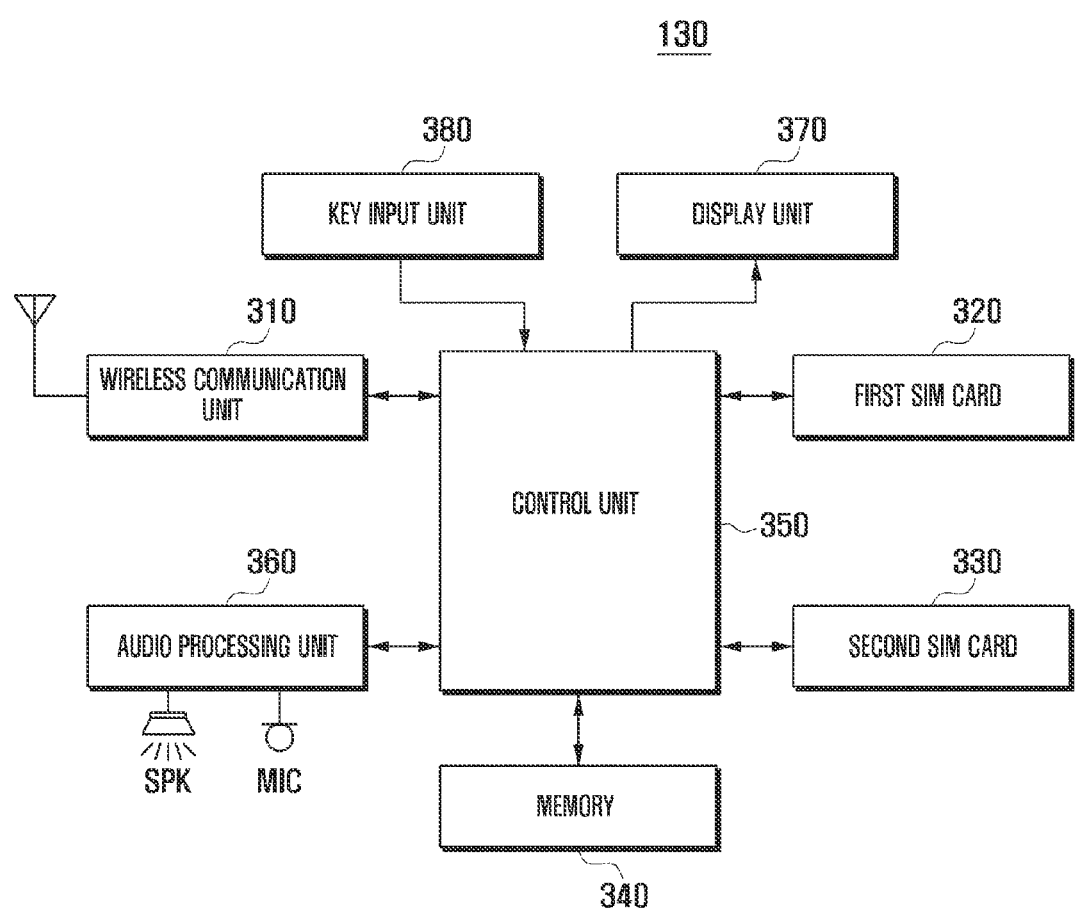
FIG. 3 is a block diagram illustrating an internal configuration of a communication terminal according to an exemplary embodiment of the present invention.

FIG. 3 is a block diagram illustrating an internal configuration of a communication terminal according to an exemplary embodiment of the present invention. In this exemplary embodiment, the communication terminal is a mobile phone.

Referring to FIG. 3, the communication terminal 130 includes a wireless communication unit 310, a first subscriber identification module (SIM) card 320, a second SIM card 330, a memory 340, a control unit 350, an audio processing unit 360, a display unit 370, and a key input unit 380. The communication terminal may also include additional and/or different units. Similarly, the functionality of two or more of the above units may be integrated into a single component.

The wireless communication unit 310 performs a wireless communication function of the communication terminal 130. The wireless communication unit 310 performs communication using a communication protocol supported by the first communication network or the second communication network. The wireless communication unit 310 wirelessly transmits and receives a signal with the first base station 110 and the second base station 120. The wireless communication unit 310 includes a Radio Frequency (RF) transmitter, which performs a frequency up conversion and amplification of a transmission signal, and an RF receiver, which performs low noise amplification and a frequency down conversion of a received signal.

The first SIM card 320 and the second SIM card 330 support a wireless communication function of the communication terminal 130. The first SIM card 320 supports communication with the first communication network, and the second SIM card 330 supports communication with the second communication network. The first SIM card 320 and the second SIM card 330 may be smart cards that store SIM information required to communicate with the first communication network 110 and second communication network 120, such as, for example, information about a subscriber, authentication, or related record of communication. Data is managed in the first SIM card 320 and the second SIM card 330 by a file system that is built on a Master File (MF), a Dedicated File (DF) and an Elementary File (EF). The first SIM card 320 and the second SIM card 330 may be detachable from the communication terminal 130 using a card connection unit (not shown).

The memory 340 may include a program memory and a data memory. The program memory stores programs for controlling a general operation of the communication terminal 130. The program memory stores programs for a call waiting service according to an exemplary embodiment of the present invention. The data memory stores data generated while executing programs.

The control unit 350 controls overall operations of the communication terminal 130. The control unit 350 includes a data processing unit having a transmitter for encoding and modulating a transmission signal and a receiver for decoding and demodulating a received signal. The data processing unit may also include a modem and a codec. The codec may include a data codec for processing a packet data and an audio codec for processing an audio signal such as, for example, a voice.

The control unit 350 controls a wireless communication with the first communication network and the second communication network using the wireless communication unit 310 as a single communication module. The control unit 350 also controls a wireless communication with the first communication network using the first SIM card 320 and a wireless communication with the second communication network using the second SIM card 330. According to an exemplary embodiment of the present invention, the control unit 350 is assigned the index of the time slot of each subframe by the first base station 110 and the second base station 120 for use in communication therebetween.

The time slot for the first base station 110 and the time slot for the second base station 120 in each subframe can be spaced apart from each other to have a maximum time interval therebetween. For example, in a certain subframe, when the time slot for the first base station 110 is indexed '0,' the time slot for the second base station 120 can be indexed '3.' The control unit 350 communicates with the first base station 110 and the second base station 120 through the respective time slot corresponding to the index for the first base station 110 and the second base station 120 in the subframe.

The control unit 350 performs a multi-standby mode for the first communication network and the second communication network according to the exemplary embodiment of the present invention. The control unit 350 periodically receives the preamble or pilot signal from the first base station 110 and the second base station 120. The control unit 350 periodically transmits the paging signal to the first base station 110 and the second base station 120. The control unit 350, in a maximum capacity, may transmit the paging signal at a period of 470 ms. The control unit 350 performs a call mode through at least one of the first base station 110 and the second base station 120 according to the exemplary embodiment of the present invention. While performing the call mode through the first base station 110, the control unit 350 may maintain the standby mode with respect to the second base station 120. The control unit 350 periodically transmits the paging signal to the second base station 120. Similarly, while performing the call mode through the second base station 120, the control unit 350 may maintain the standby mode with respect to the first base station 110. The communication terminal 130 periodically transmits the paging signal to the first base station 110.

The audio processing unit 360 plays a received audio signal outputted from the audio codec of the data processing unit by using a speaker SPK or transmits a transmission audio signal generated from a microphone MIC to the audio codec of the data processing unit.

The display unit 370, under the control of the control unit 350, displays the status of the communication terminal 130. The display unit 370 may be implemented as a Liquid Crystal Display (LCD). In this case, the display unit 370 may include an LCD control unit, a memory for storing a data to be displayed, and an LCD display unit. When the display unit 370 employs a touch screen, the LCD may act as an input unit.

The key input unit 380 includes keys for inputting numeric and character information as well as various function keys.

Figure 4:
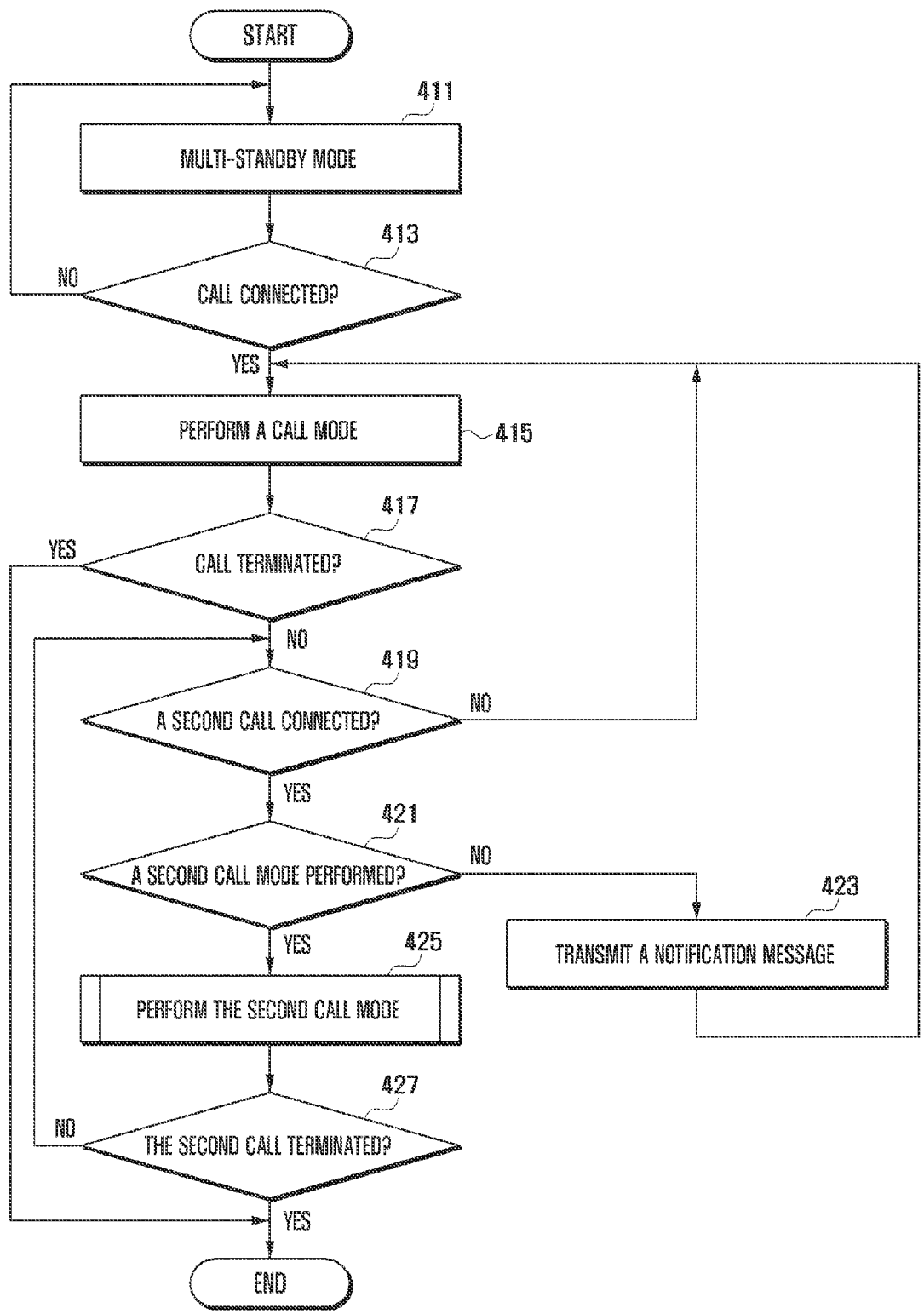
FIG. 4 is a flowchart illustrating a communication procedure in a communication terminal according to an exemplary embodiment of the present invention.

FIG. 4 is a flowchart illustrating a communication procedure in a communication terminal according to an exemplary embodiment of the present invention.

Referring to FIG. 4, the control unit 350 performs the multi-standby mode in step 411. The control unit 350 is connected to the first base station 110 via the wireless communication unit 310 and the first SIM card 320. The control unit 350 is connected to the second base station 120 via the wireless communication unit 310 and the second SIM card 330. The control unit 350 is connected to the first base station 110 and the second base station 120 using the wireless communication unit 310 as a single communication module. The control unit 350 periodically receives the preamble or pilot signal from the first base station 110 and the second base station 120. The control unit 350 is assigned the index of the time slot by the first base station 110 and the second base station 120 for use in communication therebetween. The control unit 350 transmits the paging signal to the first base station 110 and the second base station 120 from a certain subframe at a preset time period. The control unit 350 may transmit the paging signal to the first base station 110 and the second base station 120 using the time slot having the index corresponding to the first base station 110 and the second base station 120, respectively.

When a call is connected while the multi-standby mode is performed at step 411, the control unit 350 detects this event in step 413, and performs the call mode in step 415. If the call is connected with the first base station 110, the control unit 350 performs the call mode through the first base station 110. When the first base station 110 receives the call or the communication terminal 130 transmits the call to the first base station 110, the call can be connected to the communication terminal 130. The control unit 350 performs the call mode using the wireless communication unit 310 and the first SIM card 320. While performing the call mode through the first base station 110, the control unit 350 maintains the standby mode with respect to the second base station 120. The control unit 350 not only performs the call mode through the first base station 110 via the wireless communication unit 310, but also maintains the standby mode with respect to the second base station 120. The control unit 350 performs the call mode through the time slot for the first base station 110 and performs the standby mode through the time slot for the second base station 120. The control unit 350 alternately uses the wireless communication unit 310 corresponding to the time slot for the first base station 110 and corresponding to the time slot for the second base station 120.

When the call is terminated while performing the call mode at step 415, the control unit 350 detects this event in step 417, and terminates the communication procedure. The control unit 350 may detect the termination of the call when the first base station 110 terminates the call or the communication terminal 130 terminates the call. The control unit 350 switches to the standby mode by terminating the call mode with respect to the first base station 110. In this manner, the control unit 350 performs the multi-standby mode.

When a second call is connected while the call mode is being performed at step 415, the control unit 350 detects this event in step 419, and determines whether to perform a second call mode in step 421. When the second base station 120 receives the call or the communication terminal 130 transmits the call to the second base station 120, the communication terminal 130 can be connected to the second call. When the second call is connected with the second base station 120 while performing the call mode with the first base station 110, the control unit 350 determines whether to perform the second call mode with the second base station 120. The control unit 350 may display a screen through the display unit 370 to inquire whether to perform the second call mode. The control unit 350 may then determine whether to perform the second call mode according to a command received through the key input unit 380 or a touch screen.

When it is determined that the second call mode does not need to be performed at step 421, the control unit 350 transmits a notification message to notify that a first call is being performed in step 423, and returns to step 415. The control unit 350 notifies the second base station 120 through the notification message that the second call is not to be handled. In this case, the control unit 350 transmits the notification message to the second base station 120. The control unit 350 may transmit the notification message using a Short Message Service (SMS).

When it is determined that the second call mode needs to be performed at step 421, the control unit 350 performs the second call mode in step 425. The control unit 350 performs the second call mode through the second base station 120 using the wireless communication unit 310. The control unit 350 performs the second call mode through the time slot having the index corresponding to the second base station 120. An operation of performing the second call mode by the control unit 350 is described below.

Figure 5:
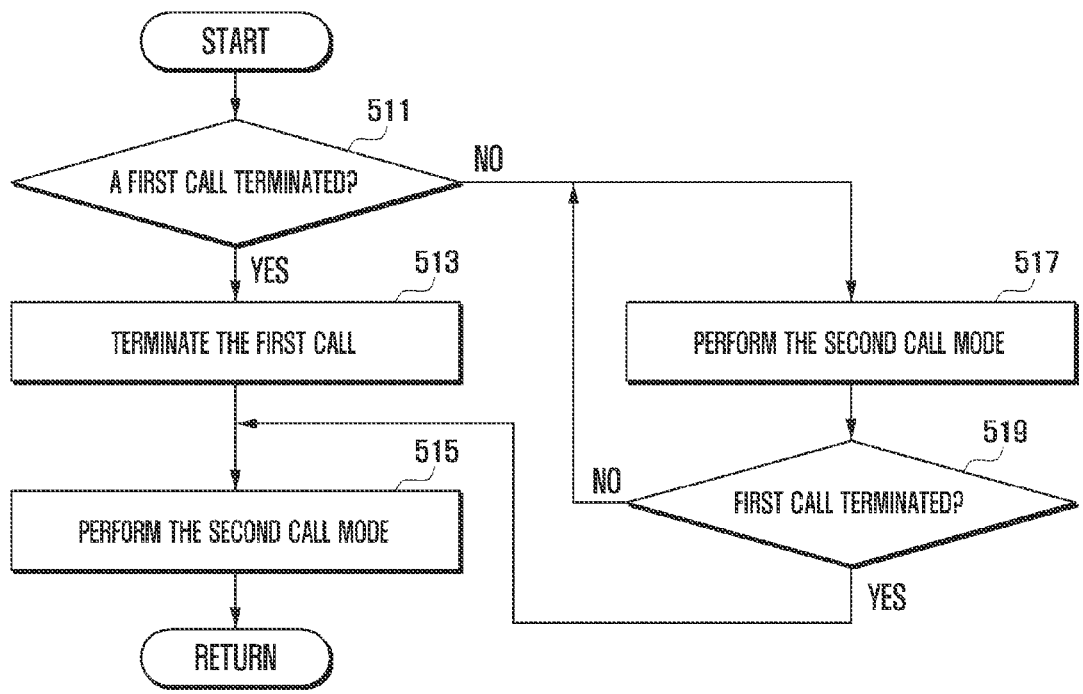
FIG. 5 is a flowchart illustrating a procedure of processing a second call during handling of a first call according to an exemplary embodiment of the present invention.

FIG. 5 is a flowchart illustrating a procedure of processing a second call during handling of a first call according to an exemplary embodiment of the present invention.

Referring to FIG. 5, when it is determined to perform the second call mode at step 421, the control unit 350 determines whether to terminate a first call mode in step 511. The control unit 350 can display a message through the display unit 370 to inquire whether to terminate the first call mode. The control unit 350 may determine whether to terminate the first call mode according to the command received through the key input unit 380 or the touch screen. When it is determined to terminate the first call mode at step 511, the control unit 350 terminates the first call mode in step 513. The control unit 350 cancels a call connection with the first base station 110, and switches to the standby mode with respect to the first base station 110.

After performing the second call mode in step 515, the control unit 350 returns to the procedure in FIG. 4. The control unit 350 performs the second call mode through the second base station 120. The control unit 350 performs the second call mode via the wireless communication unit 310 and the second SIM card 330. When performing the second call mode through the second base station 120, the control unit 350 maintains the standby mode with respect to the first base station 110. The control unit 350 not only performs the second call mode through the second base station 120 using the wireless communication unit 310 but also performs the standby mode with respect to the first base station 110. The control unit 350 performs the second call mode through the time slot for the second base station 120 and performs the standby mode through the time slot for the first base station 110. The control unit 350 alternately uses the wireless communication unit 310 corresponding to the time slot for the first base station 110 and corresponding to the time slot for the second base station 120.

When it is determined that the first call mode does not need to be terminated at step 511, the control unit 350 performs the second call mode in step 517. Namely, while performing the first call mode through the first base station 110, the control unit 350 performs the second call mode through the second base station 120. The control unit 350 performs the second call mode via the wireless communication unit 310 and the second SIM card 330. The control unit 350 not only performs the first call mode through the first base station 110 through the wireless communication unit 310 but also performs the second call mode through the second base station 120. The control unit 350 performs the first call mode through the time slot having the index corresponding to the first base station 110 and performs the second call mode through the time slot having the index corresponding to the second base station 120. The control unit 350 alternately uses the wireless communication unit 310 corresponding to the time slot for the first base station 110 and corresponding to the time slot for the second base station 120.

In this manner, the control unit 350 can perform a multi-party call through the first base station 110 and the second base station 120 using a single communication module. The control unit 350 utilizes the time slots of each subframe that are separately assigned to the first base station 110 and the second base station 120 in communication therewith, thereby performing the multi-party call.

However, because the time slot for the first base station 110 and the time slot for the second base station 120 are separated, an echo component may occur due to a time delay between audio signals transmitted from the control unit 350 to the first base station 110 and to the second base station 120. An audio signal to be transmitted to the second base station 120 may be introduced to the time slot for the first base station 110. Similarly, an audio signal to be transmitted to the first base station 110 may be introduced to the time slot for the second base station 120. Accordingly, the control unit 350 may remove the echo component.

To remove the echo component, the control unit 350 may predict a magnitude of the echo component and calculate a constant to be added or subtracted corresponding to the predicted magnitude of the echo component. Alternatively, the echo component may be removed by a counterpart communication terminal (not shown) that is connected through the first base station 110 or the second base station 120. The counterpart communication terminal may predict the magnitude of the echo component and calculate the constant to be added or subtracted corresponding to the predicted magnitude of the echo component.

When the first call is terminated while performing the second call mode at step 517, the control unit 350 detects this event in step 519, and proceeds to step 515. The control unit 350 may detect the termination of the first call when the first base station 110 terminates the first call or the communication terminal 130 terminates the first call. The control unit 350 terminates the first call mode corresponding to the first base station 110 and switches to the standby mode.

When the second call is terminated while performing the second call mode at step 425, the control unit 350 detects this event in step 427, and terminates the communication process. The control unit 350 may detect termination of the second call when the second base station 120 terminates the second call or the communication terminal 130 terminates the second call. The control unit 350 terminates the second call mode corresponding to the second base station 120 and switches to the standby mode.

When a third call is connected while performing the second call mode at step 425, the control unit 350 returns to step 419. The call mode being currently performed can be treated as the first call mode and a third call mode to be performed can be treated as the second call mode.

According to exemplary embodiments of the present invention, a multiple standby mode can be performed with respect to a plurality of communication networks using a single communication module. When performing a call mode through one of the communication networks, a standby mode can be performed with respect to other communication networks. The communication terminal can maintain a connection to the other communication networks.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A communication method in a communication terminal having a single communication module and at least two Subscriber Identification Module (SIM) cards, the method comprising:
   performing a first call mode when a first call is connected through a first base station in a standby mode using the communication module and a first SIM card through a first time slot in each frame allocated by the first base station;
   detecting, when a second call is received through a second base station while performing the first call mode, a user input for determining whether to perform a second call mode;
   performing, when a user input corresponding to a request to perform the second call mode is detected, the second call mode using the communication module and a second SIM card through a second time slot in the each frame allocated by the second base station, the second time slot being spaced apart from the first time slot;
   estimating an echo component from the first call and the second call;
   calculating a function to reduce the echo component based on the estimated echo component; and
   modifying an audio signal corresponding to at least one of the first call and the second call based on the calculated function to reduce the echo component.

2. The method according to claim 1, wherein performing the first call mode comprises:
   transmitting, when performing the first call mode, a paging signal to the second base station through the second time slot.

3. The method according to claim 1, wherein detecting of the user input comprises:
   displaying a user interface including a message for asking whether to perform the second call mode; and
   detecting the user input for determining whether to perform the second call mode through the user interface.

4. The method according to claim 1, wherein performing the second call mode comprises:
   determining whether to terminate the first call mode;
   terminating the first call mode when it is determined to terminate the first call mode; and
   maintaining the first call mode when it is determined not to terminate the first call mode.

5. The method according to claim 1, further comprising:
   transmitting, when a user input corresponding to request not to perform the second call mode is detected, a notification message to the second base station to notify that the first call mode is being performed.

6. The method of claim 1, further comprising:
   performing a multi-standby mode when neither the first call nor the second call is connected.

7. The method of claim 6, wherein, when the multi-standby mode is performed, the single mobile device receives at least one of a preamble and a pilot signal from the first base station and receives at least one of a preamble and a pilot signal from the second base station.

8. A communication apparatus in a communication terminal, the apparatus comprising:
   an input unit for detecting a user input;
   a single communication module for connecting to at least two base stations;
   at least two Subscriber Identification Module (SIM) cards, each storing SIM information corresponding to one of the at least two base stations; and
   a control unit for performing, when a first call is connected through a first base station in a standby mode, a first call mode using the communication module and a first SIM card through a first time slot in each frame allocated by the first base station, for controlling, when a second call is received through a second base station while performing the first call mode, the input unit to detect a user input for determining whether to perform a second call mode, for performing, when a user input corresponding to request to perform the second call mode is detected, the second call mode using the communication module and a second SIM card through a second time slot in the each frame allocated by the second base station, for estimating an echo component from the first call and the second call, for calculating a function to reduce the echo component based on the estimated echo component, and for modifying an audio signal corresponding to at least one of the first call and the second call based on the calculated function to reduce the echo component,
wherein the second time slot is spaced apart from the first time slot.

9. The apparatus according to claim 8, wherein the control unit controls, when performing the first call mode, the transmission to transmit a paging signal to the second base station through the second time slot.

10. The apparatus according to claim 8, further comprising:
a display unit to display a user interface including a message for asking whether to perform the second call mode,
wherein the input unit detects the user input for determining whether to perform the second call mode through the user interface.

11. The apparatus according to claim 8, wherein the control unit determines whether to terminate the first call mode, terminates the first call mode when it is determined to terminate the first call mode, and maintains the first call mode when it is determined not to terminate the first call mode.

12. The apparatus according to claim 8, wherein the control unit controls the communication module, when a user input corresponding to a request not to perform the second call mode is detected, to transmit a notification message to the second base station to notify that the first call mode is being performed and maintains the first call mode.

13. The communication apparatus of claim 8, wherein the control unit is further configured to perform a multi-standby mode when neither the first call nor the second call is connected.

14. A method of communicating with at least two different communication networks via a single mobile device, the method comprising:
performing a first call mode via a first time slot of a frame when a first call is connected through a first base station of a first communication network;
detecting, when a second call is received through a second base station while performing the first call mode, a user input for determining whether to perform a second call mode;
estimating an echo component from the first call and the second call;
calculating a function to reduce the echo component based on the estimated echo component;
modifying an audio signal corresponding to at least one of the first call and the second call based on the calculated function to reduce the echo component; and
when a user input corresponding to a request to perform the second call mode is detected, performing a second call mode via a second time slot of the frame,
wherein the first time slot and the second time slots are both time slots of a frame.

15. The method of claim 14, wherein the first time slot and the second time slot are separated by at least one intervening time slot of the frame.

16. The method of claim 14, further comprising:
performing a multi-standby mode when neither the first call nor the second call is connected.

17. The method of claim 16, wherein, when the multi-standby mode is performed, the single mobile device receives at least one of a preamble and a pilot signal from the first communication network and receives at least one of a preamble and a pilot signal from the second communication network.

18. The method of claim 14, wherein the single mobile device communicates with the first communication network and the second communication network using a common communication module.

* * * * *